US006939641B2

(12) United States Patent
Kincaid et al.

(10) Patent No.: US 6,939,641 B2
(45) Date of Patent: Sep. 6, 2005

(54) DETACHED PORTABLE BATTERY WITH UNIVERSAL CLIP

(75) Inventors: Myra Kincaid, Talking Rock, GA (US); Charles Friedli, Lawrenceville, GA (US); Due Q. Huynh, Lawrenceville, GA (US); Kevin Maggert, Lawrenceville, GA (US)

(73) Assignee: Motorola, Inc., Schaumburg, IL (US)

( * ) Notice: Subject to any disclaimer, the term of this patent is extended or adjusted under 35 U.S.C. 154(b) by 363 days.

(21) Appl. No.: 10/324,486

(22) Filed: Dec. 20, 2002

(65) Prior Publication Data

US 2004/0121224 A1 Jun. 24, 2004

(51) Int. Cl.[7] .......................... H01M 2/10; B65D 85/00

(52) U.S. Cl. ....................... 429/100; 206/703; 224/195; 224/269; 224/902

(58) Field of Search ....................... 429/96–100; 2/319; 24/3.12; 206/703–705; 220/751; 224/195, 269, 902, 904; 312/223.1

(56) References Cited

U.S. PATENT DOCUMENTS

| | | | | | |
|---|---|---|---|---|---|
| 3,810,550 | A | * | 5/1974 | Longarzo | 211/69.6 |
| 4,481,458 | A | * | 11/1984 | Lane | 320/112 |
| 5,019,767 | A | * | 5/1991 | Shirai et al. | 320/112 |
| 5,680,026 | A | | 10/1997 | Lueschen | |
| 6,106,971 | A | | 8/2000 | Spotnitz | |
| 6,260,978 | B1 | | 7/2001 | St. John | |
| 6,428,925 | B1 | | 8/2002 | Takeno et al. | |
| 6,540,122 | B1 | * | 4/2003 | Petersen | 224/197 |

* cited by examiner

*Primary Examiner*—Gregg Cantelmo
(74) *Attorney, Agent, or Firm*—Philip H. Burrus, IV

(57) ABSTRACT

This invention includes a battery pack capable of attaching to an ordinary belt. The battery pack includes springy, U-shaped clips that are capable of coupling to objects such as belts. The clips are coupled to the battery pack by way of ball and socket joints, thereby allowing the battery pack to be mounted at any of a number of angles, including horizontal and vertical configurations. The battery pack optionally includes a torso accommodation curve to make the battery pack more comfortable for the user.

5 Claims, 4 Drawing Sheets

DETACHED PORTABLE BATTERY WITH UNIVERSAL CLIP

BACKGROUND

1. Technical Field

This invention relates generally to rechargeable batteries for portable electronic devices, and more specifically to auxiliary rechargeable batteries with means of attachment to garments and other objects.

2. Background Art

Portable electrical devices rely upon rechargeable batteries for their portability. Products ranging from power tools to cellular phones each depend upon a battery to be able to operate without a cord attached to an outlet. These rechargeable batteries are manufactured using many different chemistries, including nickel-based chemistries, like nickel metal hydride (NiMH) and nickel cadmium (NiCad), and lithium-based chemistries, like lithium ion and lithium polymer. Each of these chemistries offers certain advantages. For example, lithium batteries are generally lightweight, with high energy densities. Nickel batteries, while being quite heavy, generally offer higher peak current capability.

For low current applications, like cellular phones, lithium batteries work quite well. Since they are very lightweight, they may be coupled directly to the electronic device without causing strain or inconvenience to the user. Power tool applications, like drills and saws for example, typically require higher peak currents than that provided by lithium cells. For this reason, nickel based cells are generally used for power tool applications.

While nickel cells work well in power tool applications, the additional weight added by coupling as many as twelve cells to a tool can cause problems. For example, imagine a carpenter working on the ceiling of a new home. If the carpenter is forced to hold a drill, with three pounds of batteries attached, above his head for eight or more hours, he may grow tired. His tired and sore muscles may compromise the accuracy of his drilling.

Prior art solutions have attempted to solve this problem by removing the weight of the batteries from the power tool. By way of example, U.S. Pat. No. 6,106,971, entitled "Portable Power Tool Having Low Rate, Rechargeable Batteries Attached to Clothing," issued to Spotnitz on Aug. 22, 2000, teaches one such solution. Referring now to FIG. 1, illustrated therein is a means for attaching batteries 16 to clothing 34 in a traditional manner (i.e. by way of sewing) as taught by Spotnitz. The batteries 16 couple to the power tool 12 by way of a cable 22 that may be optionally coupled to a reel 20. Pockets 32 appear on the clothing 34 into which batteries are disposed. By wearing the battery clothing 34, the user 30 does not need to sustain the weight of the batteries 16 above his head.

The problem with this prior art solution is that it requires special clothing. The batteries must either be sewn into the garment, or the garment must provide special pockets with electrical connections to couple the batteries in parallel as taught by Spotnitz. In either case, the user must purchase an expensive, special piece of clothing. He must wear the clothing each time he uses the power tool. To make matters worse, clothing with electrical connections invariably must be professionally cleaned. A workman who uses such a garment regularly may not be prone to dry cleaning the garment on a daily basis. After repeated uses without cleaning, the odor emitted by the garment may be distracting to other workers on the site, again compromising work output.

There is thus a need for an improved, detachable battery pack.

DETAILED DESCRIPTION OF THE INVENTION

Figure 1:
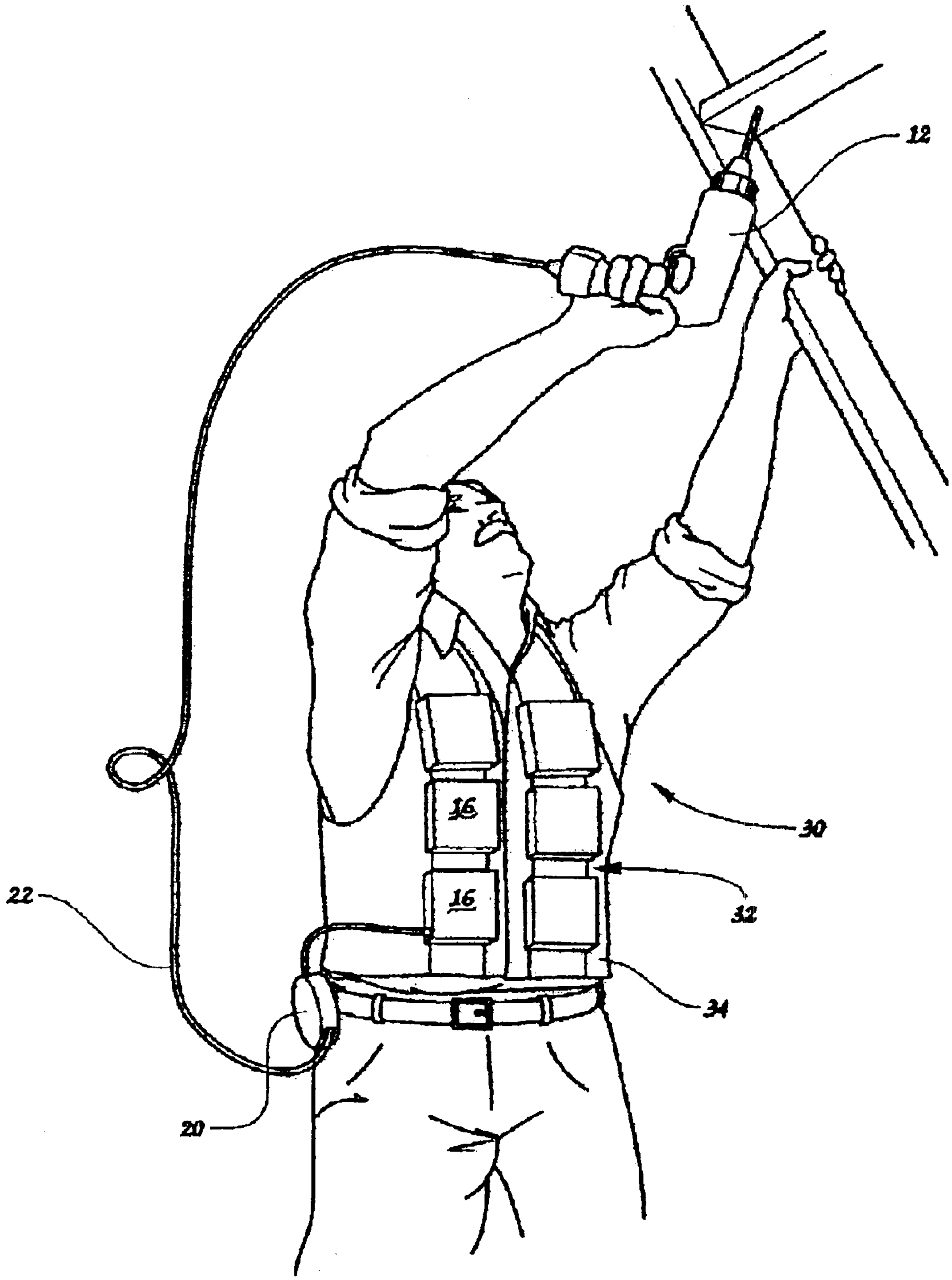
FIG. 1 is a prior art battery garment.

A preferred embodiment of the invention is now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on."

This invention includes a detached battery pack for use with electric devices. The battery pack couples to, for instance, a power tool by way of a lightweight cord, thereby removing the battery weight from the device itself. The battery pack is suitable for mounting on a standard, off the shelf belt by way of a springy, U-shaped clip coupled to the battery pack by ball and socket joints. The battery pack includes a torso accommodation curve for added user comfort. The ball and socket joints allow the springy clips to rotate, thereby allowing the battery pack to be mounted on other objects, like peg boards, construction materials, pick-up trucks, re-bar, cables, and the like.

Figure 2:
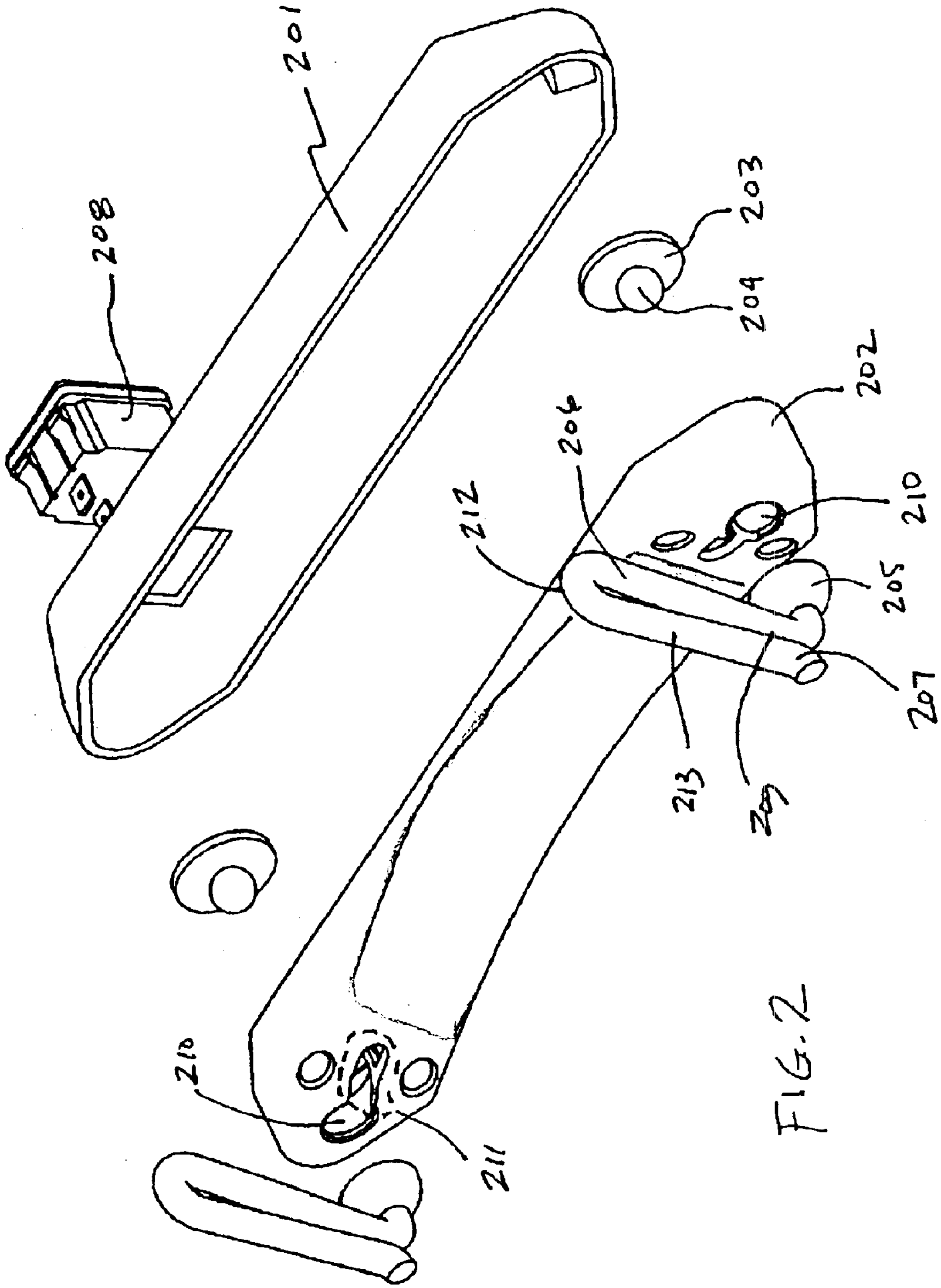
FIG. 2 is an exploded, top, left, inner isometric view of a battery pack in accordance with the invention.

Referring now to FIG. 2, illustrated therein is an exploded, top, left, inner isometric view of a battery pack in accordance with the invention. The battery pack includes an outer housing 201 and an inner housing 202. The outer and inner housings 201,202 are preferably constructed by way of injection molding using a sturdy plastic like ABS.

The battery pack includes at least one clip 206 made from a springy material, preferably plastic. The clip 206 is generally U-shaped with the curved portion 212 of the "U" wider than the top 209 of the U. The stems 213 of the U optionally are preloaded against each other at the top 209 of the U, thereby providing a retention force to prevent objects inserted into the U from easily slipping out. The clip 206 optionally includes an outward curve 207 to facilitate easy insertion of objects into the clip 206.

The clip 206 includes a ball and socket means for coupling to the battery pack. In this preferred embodiment, the ball and socket means is a concave socket 205 that mates with a ball 204 disposed on a support 203 within the housings 201,202. It will be clear to those of ordinary skill in the art that the invention is not so limited. The ball and socket means may comprise a ball attached to the clip 206 that mates with a socket in the housings. In either case, the ball and socket means allows the clip 206 to rotate about the ball 204, thereby allowing the battery pack to be mounted in either vertical (using a single clip) or horizontal (using multiple clips) configuration.

The bottom housing 202 includes a corresponding number of apertures 210 for accommodating the clips 206. The aperture 210 optionally includes a recess 211 that is wide enough for the curved part 212 of the clip 206 to be inserted. The recess 211 facilitates easy assembly in mass production settings. The recess 211 adjoins the aperture 210, wherein the length of the recess in addition to the diameter of the aperture are wider than the curved portion 212 of the U shape. The battery pack includes an electrical coupling 208 for coupling a power cord to cells and circuitry disposed within the battery pack.

Figure 3:
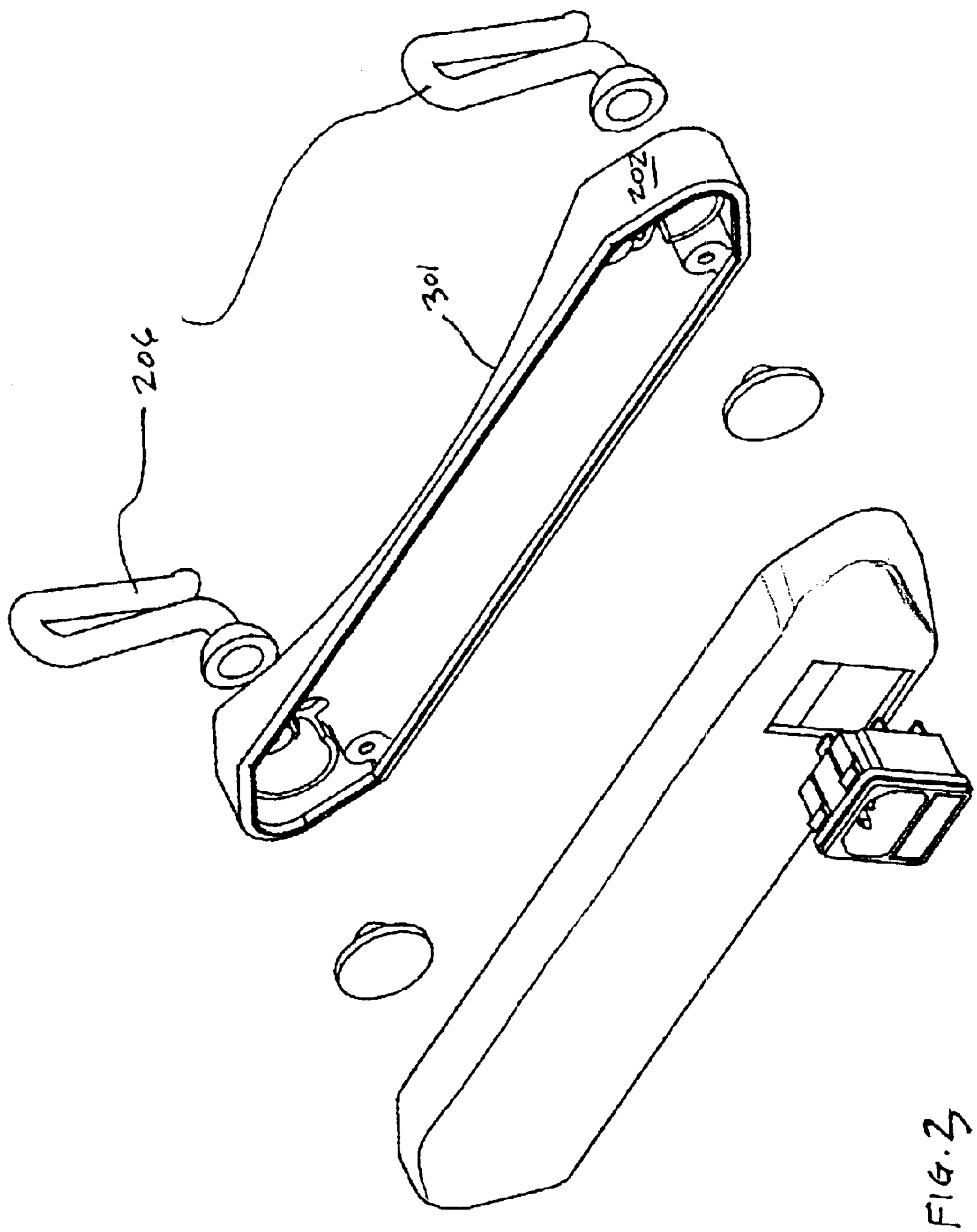
FIG. 3 is an exploded, top, right, outer isometric view of a battery pack in accordance with the invention.

Referring now to FIG. 3, illustrated therein is an exploded, top, right, outer isometric view of a battery pack in accordance with the invention. The inner housing 202 of the battery pack preferably includes a torso accommodation curve 301. When a user employs two clips 206 to attach the battery pack to a belt, the torso accommodation curve provides comfort in that the battery pack is no longer an awkward straight edge against the user's cylindrical frame.

Figure 4:
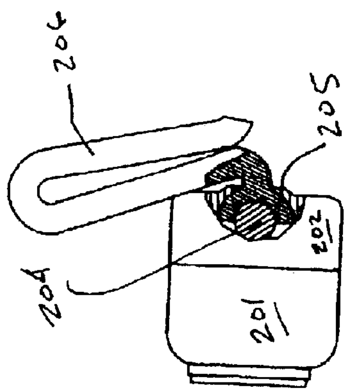
FIG. 4 is a right, elevated, cut-away view of the battery pack with the clip.
Figure 5:
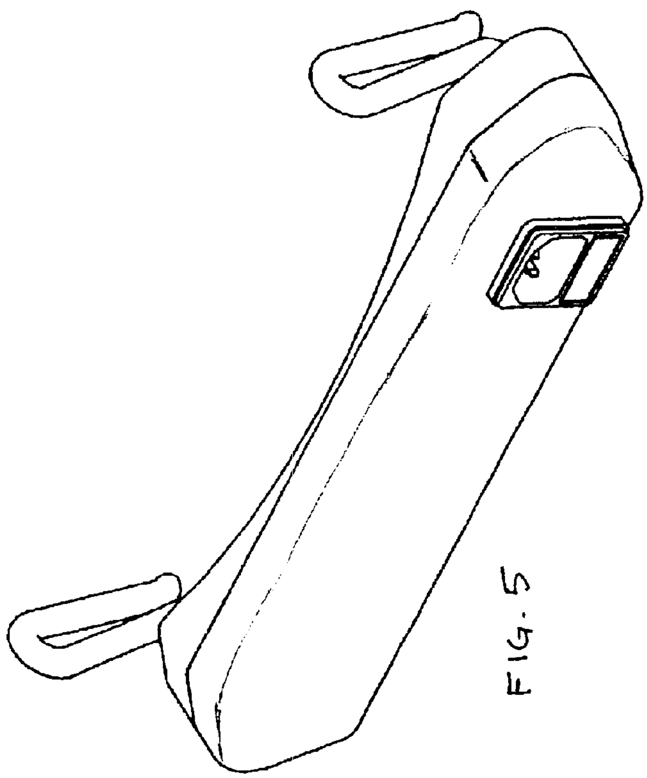
FIG. 5 is an isometric view of the battery pack completely assembled.

Referring now to FIG. 4, illustrated therein is a right, elevated, cut-away view of the battery pack with the clip. The clip 206 is coupled through the aperture to the ball 204. The ball 204 is seated in the housings 201,202 by way of the support (not shown). The ball 204 and socket 205 allow the clip 206 to rotate parallel to the drawing sheet to provide flexibility for a user that is moving a power tool from place to place. The ball 204 and socket 205 also allow the clip 206 to rotate into an out of the drawing sheet to provide for mounting the battery pack at any angle. FIG. 5 is an isometric view of the battery pack completely assembled.

The clips of this invention provide numerous advantages over the prior art. For example, the clips allow quick and easy detachment from the belt or other article. There is no need to purchase a special garment with special cleaning instructions. The ball and socket mounted clips allow a free range of motion that does not restrict the hanging positions of the battery pack.

While the preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims. For example, while a drill is used as the electric devices for discussion purposes, it will be clear that the invention is not so limited. Other electric devices include, but are not limited to, saws, grinding tools, polishing tools, lawn care tools, garden tools, video equipment, audio equipment, testing equipment, military equipment, hair driers and the like.

What is claimed is:

1. A battery pack for an electric device, the pack comprising:

a. an outer housing;

b. an inner housing; and c. at least one springy clip, the at least one springy clip comprising a ball and socket means for coupling to the inner and outer housings;

d. at least one aperture disposed along the inner housing for accommodating the at least one springy clip; and e. at least one recess adjoining the at least one aperture;

wherein the at least one springy clip is U-shaped;

wherein the length of the recess in addition to the diameter of the aperture are wider than a curved portion of the U shape.

2. The battery pack of claim 1, wherein the curved portion of U shape of the at least one springy clip is wider than the top of the U shape.

3. The battery pack of claim 2, wherein the at least one springy clip includes an outward curve.

4. The battery pack of claim 3, wherein the stems of the U shape are preloaded against each other at the top of the U shape.

5. The battery pack of claim 1, wherein the inner housing comprises a torso accommodation curve.

* * * * *